Patented Dec. 15, 1942

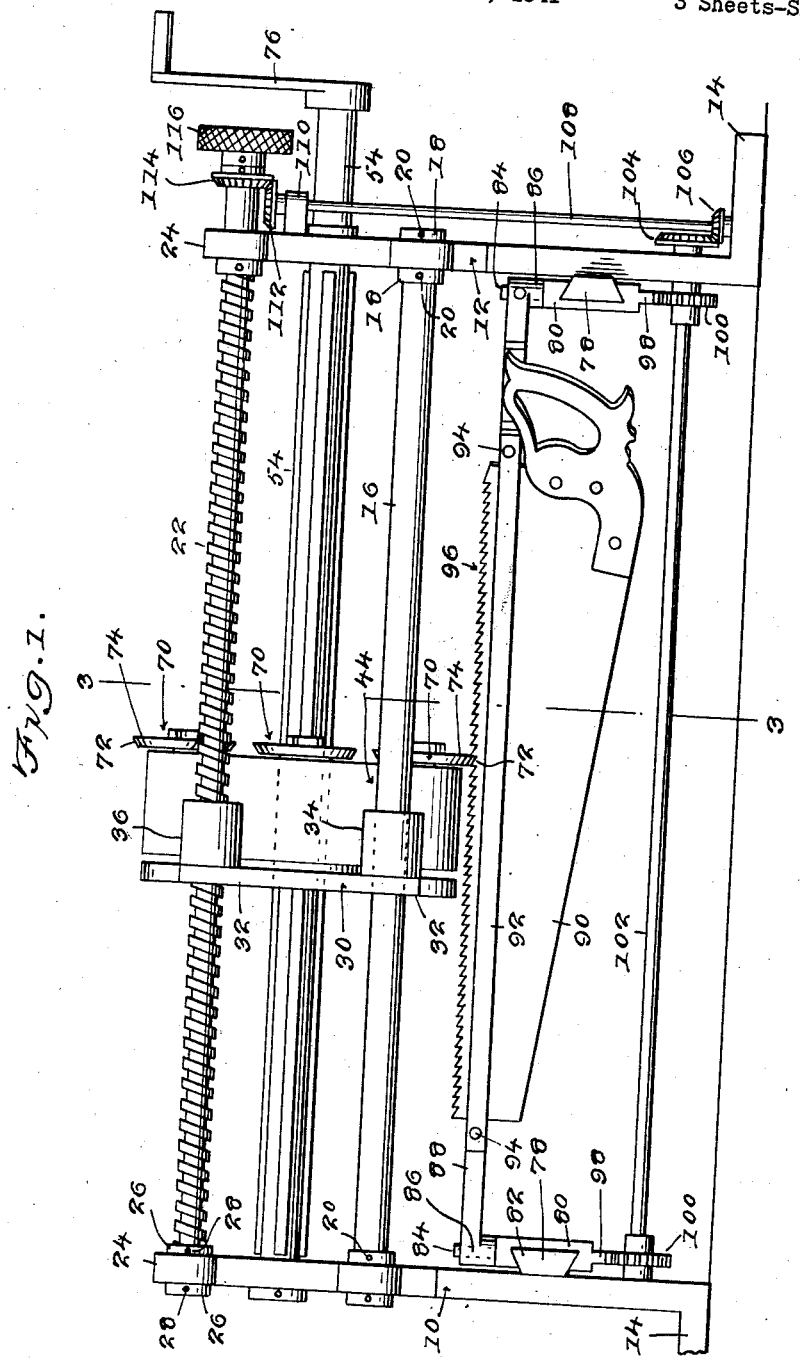

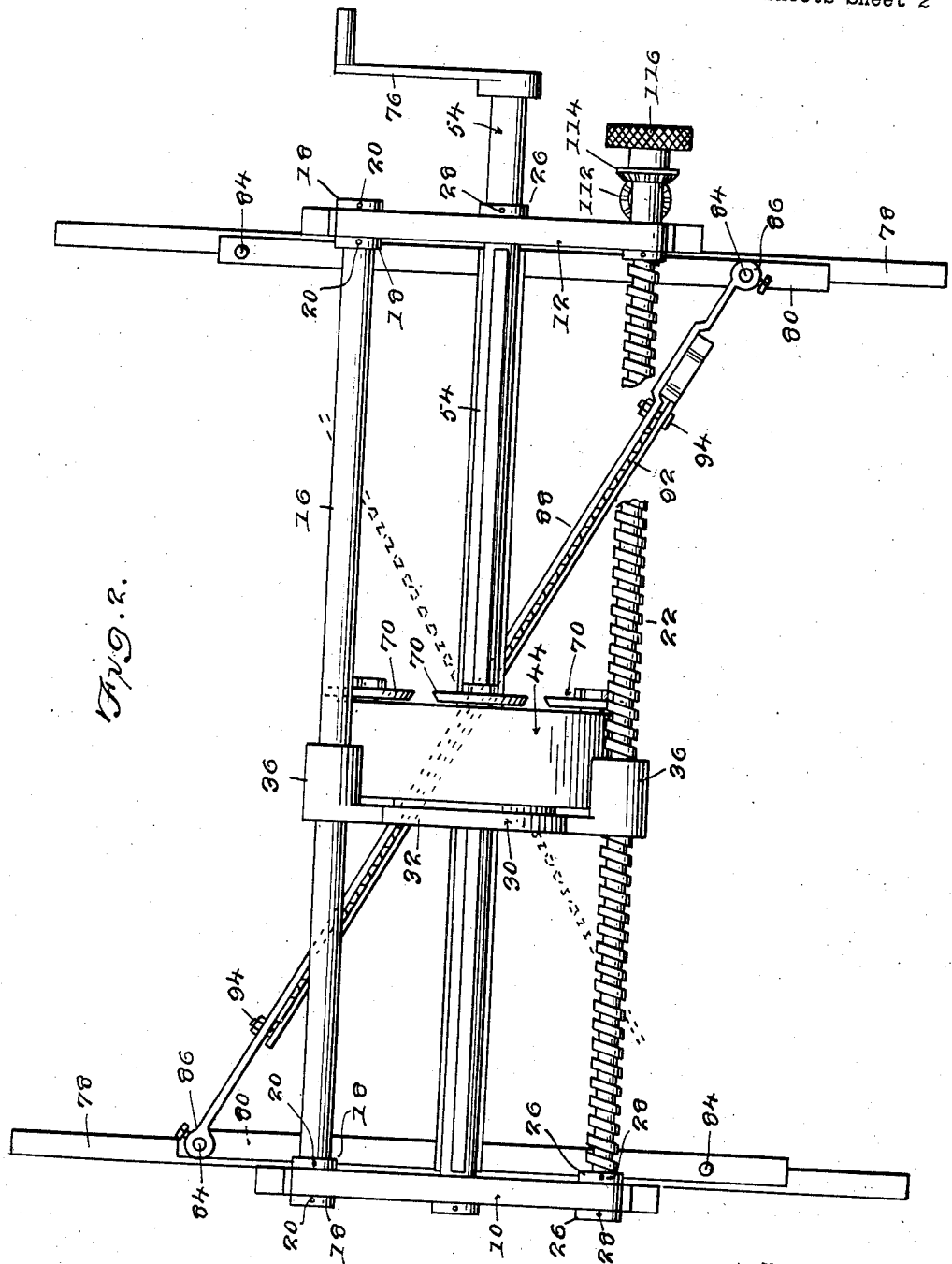

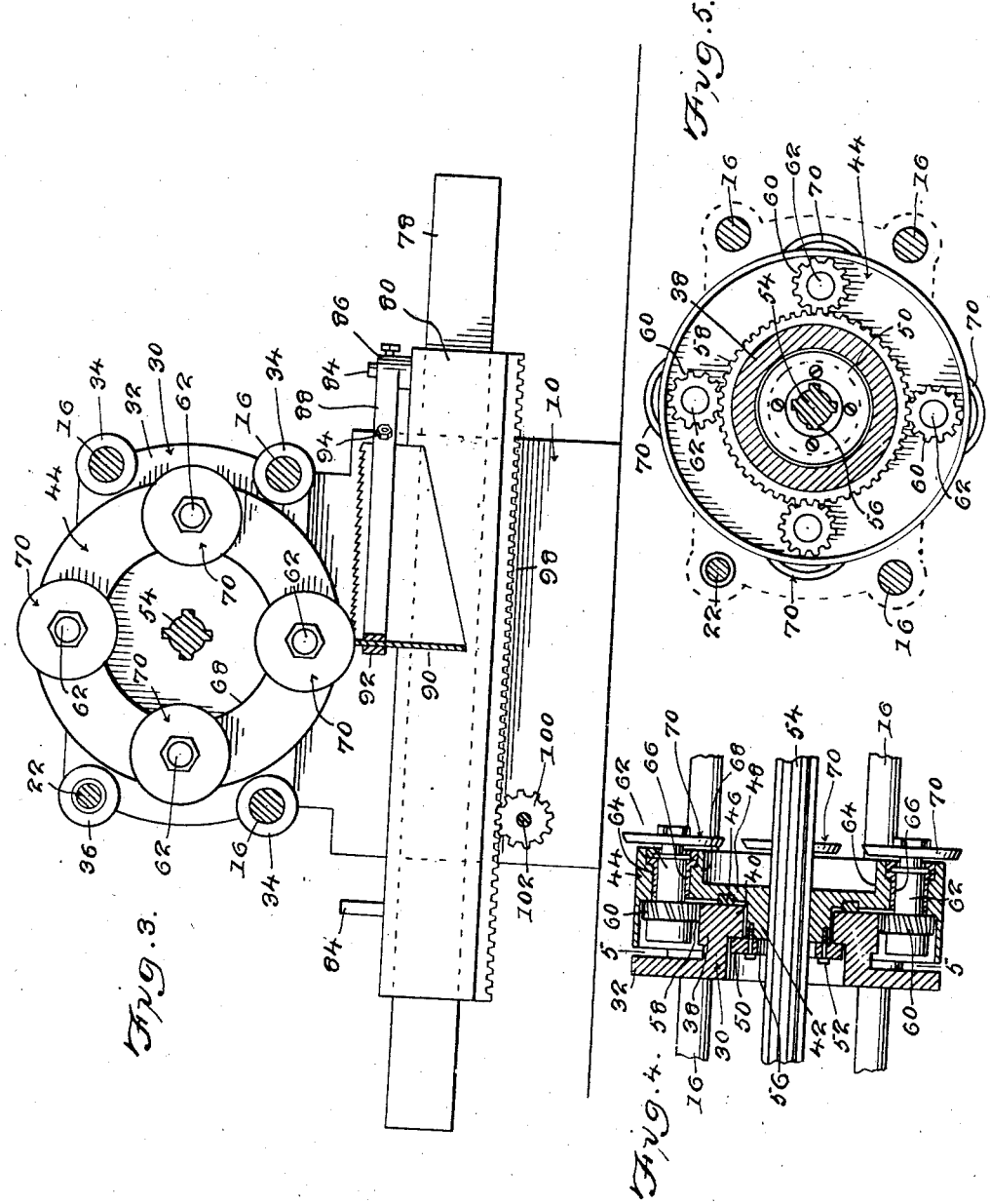

2,305,564

UNITED STATES PATENT OFFICE 2,305,564

SAW FILING DEVICE

Ralph E. Tubbs, Saint Charles, Va.

Application October 22, 1941, Serial No. 416,125

4 Claims. (Cl. 76—32)

My invention relates to hand saws, and has among its objects and advantages the provision of an improved saw filing device.

In the accompanying drawings:

Figure 1 is a side elevational view of my invention;

Figure 2 is a top plan view;

Figure 3 is a sectional view taken along the line 3—3 of Figure 1;

Figure 4 is a sectional detail view of a filing transmission; and

Figure 5 is a sectional view taken along the line 5—5 of Figure 4.

In the embodiment selected for illustration, I make use of end members 10 and 12 having base flanges 14 to rest on a work bench or the like. Guide rods 16 extend through openings in the respective end members 10 and 12 and are restrained from relative longitudinal movement by reason of collars 18 engaging opposite faces of the end members and secured to the guide rods by set screws 20. All the guide rods 16 are arranged in parallelism. A screw 22 is rotatably journaled in bearings 24 on the two end members 10 and 12 and is restrained from relative longitudinal movement by collars 26 engaging opposite faces of the two end members and secured to the screw by set screws 28. Screw 22 is arranged in parallelism with the guide rods 16. Upon the guide rod 16 is mounted a carriage 30 in the nature of a plate 32 having tubular bosses 34 sliding on the guide rods 16. Plate 32 is provided with a boss 36 having threaded connection with the screw 22 so that rotation of the latter will move the carriage longitudinally of the screw and the guide rods 16.

Referring to Figure 4, the plate 32 is provided with an annular flange 38 provided with an internal flange 40 loosely encircling a hub 42 of a rotary sharpening tool mount 44. An annular bearing member 46 is attached to the wall 48 of the mount 44 and engages the flange 38. A ring 50 is bolted to the hub 42 and engages the flange 40, so that the bearing member 46 and the ring 50 restrain the carriage 32 from relative movement longitudinally of the guide rods but permit relative rotation between the mount 44 and the carriage.

The ring 50 is bolted at 52 to the hub 42, and the latter is splined to a shaft 54, as at 56 in Figure 5, so that the mount 44 and the carriage 30 may move as a unit longitudinally of the guide rods and the shaft 54 when the screw 22 is rotated. However, rotation of the shaft 54 imparts rotary motion to the mount 44 relatively to the carriage 30.

Flange 38 is provided with an external herringbone gear 58 meshing with four equally spaced herringbone pinions 60 respectively attached to shafts 62 rotatably journaled in bushings 64 secured in openings 66 in an annular flange 68 on the plate 48. The shafts 62 are arranged in parallelism with the shaft 54 and are spaced equal distances from this shaft. To each of the shafts 62 is secured a filing disk 70. All the disks are provided with peripheral faces 72 converging in the same direction toward their respective axes. The angularity of the faces 72 corresponds to the angularity of the saw teeth, so that the faces 74 of the filing disks and their respective peripheral faces 72 conform to the notch contour of the saw.

Rotation is imparted to the filing disks 70 through rotation of a crank 76 attached to the shaft 54.

Each end member 10 and 12 is provided with a dovetail 78 extending horizontally across its inner face. The dovetails 78 are arranged in parallelism. Guides 80 are provided with dovetail grooves 82 for slidably connecting the guides with the respective dovetails 78. Each guide 80 is provided with two upstanding pins 84 for selective connection with an eye 86 at one end of a saw clamping bar 88. The saw blade 90 is clamped against the bar 88 by a clamp member 92 through the medium of bolts 94 extending through both the bar 88 and the clamp member. The toothed edge 96 of the saw blade 90 is arranged in parallelism with the guide rods 16.

Figure 2 illustrates the eyes 86 as being attached to diagonally opposite pins 84 on the respective guides 80 so that the saw blade 90 is angularly positioned with respect to the guide rods 16 when viewed from the top. A rack 98 depends from each of the guides 80 and meshes with a pinion 100 keyed to a shaft 102 rotatably journaled in the respective end members 10 and 12. To one end of the shaft 102 is secured a bevel gear 104 meshing with a bevel gear 106 keyed to an upright shaft 108 having one end rotatably journaled in one of the base flanges 14 and its upper end rotatably journaled in a bearing 110 secured to the end member 12. To the upper end of the shaft 108 is secured a bevel gear 112 meshing with a bevel gear 114 keyed to the screw 22. A hand wheel 116 is secured to the screw 22.

In operation, the teeth of the saw are filed by bringing one of the filing wheels 70 into a notch in the toothed edge 96. The crank 76 is then turned for imparting rotation to the shaft 54. Such rotation of the shaft imparts rotary motion to the mount 44. Since the carriage 30 is restrained from rotation, the gear 58 remains stationary so that rotation is imparted to the pinions 60, these pinions being fixedly attached to their respective filing disks 70. The filing disks 70 are arranged in a common plane and are brought successively into engagement with the toothed edge of the saw, since the saw blade traverses the orbit traveled by the filing disks. At the same time, the filing disks are rotated at a relatively high speed. Upon completion of one filing operation, the hand wheel 116 is turned for rotating the screw 22 which shifts the carriage 30 to bring the filing disk 74 into the next position along the toothed edge 96. As the carriage 30 is shifted longitudinally on the guide rod 16, rotation of the screw 22 imparts rotation to the shaft 108, which in turn imparts rotation to the shaft 102. Thus rotation of the gears 100 will move the guides 80 longitudinally of the dovetails 78 so as to properly align the saw blade 90 with respect to the filing disks 70. When alternate saw teeth are filed, the eyes 86 are shifted to the opposite pins 84 on their respective guides 80 to change the angularity of the saw blade.

Without further elaboration, the foregoing will so fully illustrate my invention, that others may, by applying current knowledge, readily adapt the same for use under various conditions of service.

I claim:

1. A saw filing device comprising a support, guide means on said support, a carriage movable along said guide means, a mount rotatably supported by said carriage, a gear fixed on said carriage, a plurality of filing disks rotatably supported by said mount having pinions meshing with said gear, a drive shaft paralleling said guide means rotatably mounted on said support and splined to said mount for imparting rotation thereto to roll said pinions around said gear and impart rotary motion to the filing disks, said filing disks rotating with said mount about its axis of rotation, a saw support for supporting a saw blade in the orbit of said filing disks, a feed screw paralleling said guide means rotatably mounted on said support and threadedly connected with said carriage to move the latter and said mount axially of said drive shaft to shift the filing disks to successive filing positions with respect to said saw blade.

2. The invention described in claim 1 wherein said saw support holds the saw blade at an acute intersecting angle to the orbit of said filing disks, and means operatively connecting said saw support with said feed screw to impart lateral movement to the saw support and the saw blade when said carriage and said mount are moved longitudinally of the saw blade through rotation of the feed screw.

3. The invention described in claim 1 wherein said first-mentioned support comprises spaced members and in which said guide means comprise parallel rods supported on said end members, said drive shaft and said feed screw being rotatably mounted on the end members, said saw support comprising guide bars mounted on said end members in parallel relationship one with the other and at right angles to said rods, a saw clamp, sliding members movable along said guide bars and having means for detachably connecting the saw clamp thereto in diagonal relationship with said rods, racks on said slide members, a drive shaft provided with gears meshing with said shaft, and a gear connection between said last-mentioned drive shaft and said feed screw to shift said slide members on said guide bars for moving the saw blade laterally of said rods when said carriage and said mount are moved longitudinally of the rods through rotation of the feed screw.

4. A saw filing device comprising a saw blade support, a movable carriage having a mount rotatably carried thereby, a gear fixed to said carriage, a plurality of filing disks rotatably carried by said mount and having pinions meshing with said gear, and means for imparting rotation to said mount to roll said pinions around said gear and impart rotary motion to the filing disks, said filing disks rotating with said mount about its axis of rotation and said saw blade support holding the saw blade in the orbit of said filing disks.

RALPH E. TUBBS.